(12) United States Patent
Perkiö et al.

(10) Patent No.: US 11,381,158 B2
(45) Date of Patent: Jul. 5, 2022

(54) METHOD FOR CONTROLLING A POWER CONVERTER IN A FAULT CONDITION STATE AND PROTECTION OF SAME

(71) Applicant: Vacon OY, Vaasa (FI)

(72) Inventors: Jani Matti Perkiö, Tampere (FI); Juha Norrena, Mustasaari (FI); Nicklas Jan Anders Södö, Vaasa (FI)

(73) Assignee: VACON OY, Vaasa (FI)

( * ) Notice: Subject to any disclaimer, the term of this patent is extended or adjusted under 35 U.S.C. 154(b) by 100 days.

(21) Appl. No.: 16/595,851

(22) Filed: Oct. 8, 2019

(65) Prior Publication Data
US 2020/0119634 A1 Apr. 16, 2020

(30) Foreign Application Priority Data

Oct. 10, 2018 (DE) .......................... 102018124998.5

(51) Int. Cl.
*H02M 1/42* (2007.01)
*H02M 7/04* (2006.01)
*H02M 5/42* (2006.01)
*H02M 1/12* (2006.01)

(52) U.S. Cl.
CPC ............... *H02M 1/42* (2013.01); *H02M 5/42* (2013.01); *H02M 7/04* (2013.01); *H02M 1/123* (2021.05)

(58) Field of Classification Search
CPC ............ H02M 1/42; H02M 5/42; H02M 7/04; H02M 2001/123

USPC .......................................................... 363/89
See application file for complete search history.

(56) References Cited

U.S. PATENT DOCUMENTS

| 6,282,105 B1 * | 8/2001 | Boudan ............... | H02M 1/4208 363/37 |
| 2018/0099574 A1 * | 4/2018 | Zhou ..................... | H02M 7/537 |

* cited by examiner

*Primary Examiner* — Shawki S Ismail
*Assistant Examiner* — Monica Mata
(74) *Attorney, Agent, or Firm* — McCormick, Paulding & Huber PLLC (57) ABSTRACT

A controller (203) comprises a processing system (205) for controlling a power electronic converter during a short circuit taking place in a direct voltage side of the power electronic converter. The processing system recognizes a direction of current in a phase (126-128) of an alternating voltage side of the power electronic converter, sets a high-leg controllable switch (108-110) of the phase to a conductive state while keeping a low-leg controllable switch (111-113) of the phase in a non-conductive state when the recognized direction of the current is outwards from the power electronic converter, and otherwise sets the low-leg controllable switch to the conductive state while keeping the high-leg controllable switch in the non-conductive state. Thermal loadings of freewheeling diodes (114-119) of the power electronic converter are reduced since currents needed to burn input fuses (122) of the power electronic converter are shared between the controllable switches and the freewheeling diodes.

20 Claims, 4 Drawing Sheets

METHOD FOR CONTROLLING A POWER CONVERTER IN A FAULT CONDITION STATE AND PROTECTION OF SAME

CROSS-REFERENCE TO RELATED APPLICATION

This application claims foreign priority benefits under U.S.C. § 119 to German Patent Application No. 102018124998.5 filed on Oct. 10, 2018, the content of which is hereby incorporated by reference in its entirety.

TECHNICAL FIELD

The disclosure relates to a power electronic converter for transferring electric energy between an alternating voltage system and a direct voltage system. Furthermore, the disclosure relates to a controller for controlling a power electronic converter, a method for controlling a power electronic converter, and a computer program for controlling a power electronic converter.

BACKGROUND

In many cases, a power electronic converter for transferring electric energy between an alternating voltage system and a direct voltage system comprises a controllable converter bridge. The alternating voltage system can be for example a three-phase power grid or a generator, and the direct voltage system can be for example an intermediate circuit of a frequency converter or some other electric device or system having a direct voltage connection. The converter bridge comprises high-leg controllable switches connected to a positive direct voltage rail and to an alternating voltage side of the power electronic converter, low-leg controllable switches connected to a negative direct voltage rail and to the alternating voltage side, and freewheeling diodes each being connected antiparallel with a respective one of the controllable switches. The controllable switches can be for example insulated gate bipolar transistors "IGBT", gate turn off thyristors "GTO", metal oxide semiconductor field effect transistors "MOSFETS", bipolar transistors, or some other suitable semiconductor switches. The power electronic converter comprises a control system for controlling the controllable switches during use of the power electronic converter. The power electronic converter typically comprises input fuses between the alternating voltage side and an external alternating voltage system. Furthermore, the power electronic converter may comprise a filter circuitry between the converter bridge and the external alternating voltage system. The power electronic converter can be for example an active rectifier, a network inverter, or both.

A normal way to react to a short circuit in the direct voltage side of a power electronic converter of the kind described above is to keep the controllable switches in a non-conductive state and let short circuit currents to flow through the freewheeling diodes until input fuses are burned. This means that the time integrals of squared currents, i.e. $I^2t$ values, of the freewheeling diodes can be higher than the corresponding $I^2t$ values of the input fuses. In many cases, this is a limiting factor for dimensioning the freewheeling diodes leading to a need to over-dimension the freewheeling diodes for normal operation.

SUMMARY

The following presents a simplified summary in order to provide a basic understanding of some aspects of various embodiments. The summary is not an extensive overview of the invention. It is neither intended to identify key or critical elements of the invention nor to delineate the scope of the invention. The following summary merely presents some concepts in a simplified form as a prelude to a more detailed description of exemplifying embodiments.

In accordance with the invention, there is provided a new controller for controlling a power electronic converter that comprises high-leg controllable switches connected to a positive direct voltage rail of the power electronic converter and to an alternating voltage side of the power electronic converter and low-leg controllable switches connected to a negative direct voltage rail of the power electronic converter and to the alternating voltage side.

A controller according to the invention comprises a processing system configured to:

recognize a direction of current carried by a phase of the alternating voltage side in response to a fault signal indicative of a short circuit in a direct voltage side of the power electronic converter, set the high-leg controllable switch of the phase of the alternating voltage side to a conductive state while keeping the low-leg controllable switch of the phase of the alternating voltage side in a non-conductive state when the recognized direction of the current is outwards from the power electronic converter, and set the low-leg controllable switch of the phase of the alternating voltage side to the conductive state while keeping the high-leg controllable switch of the phase of the alternating voltage side in the non-conductive state when the recognized direction of the current is inwards to the power electronic converter.

The above-described operation of the controllable switches aims to distribute fault currents between freewheeling diodes of the power electronic converter and the above-mentioned controllable switches to ensure that maximum allowable $I^2t$ values of the freewheeling diodes and maximum allowable $I^2t$ values of the controllable switches are not exceeded before input fuses burn or other overcurrent breakers become non-conductive.

In accordance with the invention, there is provided also a new power electronic converter that can be for example an active rectifier, a network inverter, or both. A power electronic converter according to the invention comprises:

a converter bridge comprising positive and negative direct voltage rails connected to a direct voltage side of the power electronic converter, high-leg controllable switches connected to the positive direct voltage rail and to an alternating voltage side of the power electronic converter, low-leg controllable switches connected to the negative direct voltage rail and to the alternating voltage side, and freewheeling diodes each being connected antiparallel with one of the high-leg controllable switches and the low-leg controllable switches, and a control system for controlling the high-leg controllable switches and the low-leg controllable switches during normal use of the power electronic converter, the control system comprising a controller according to the invention for controlling the high-leg controllable switches and the low-leg controllable switches during a short circuit in the direct voltage side of the power electronic converter.

In accordance with the invention, there is provided also a new method for controlling a power electronic converter of the kind described above. A method according to the invention comprises the following control actions during a short circuit occurring in the direct voltage side of the power electronic converter:

recognizing a direction of current carried by a phase of the alternating voltage side, setting the high-leg controllable switch of the phase of the alternating voltage side to a conductive state while keeping the low-leg controllable switch of the phase of the alternating voltage side in a non-conductive state when the recognized direction of the current is outwards from the power electronic converter, and setting the low-leg controllable switch of the phase of the alternating voltage side to the conductive state while keeping the high-leg controllable switch of the phase of the alternating voltage side in the non-conductive state when the recognized direction of the current is inwards to the power electronic converter.

In accordance with the invention, there is provided also a new computer program for controlling a power electronic converter of the kind described above. A computer program according to the invention comprises computer executable instructions for controlling a programmable processor to:

recognize a direction of current carried by a phase of the alternating voltage side in response to a fault signal indicative of a short circuit in the direct voltage side of the power electronic converter, set the high-leg controllable switch of the phase of the alternating voltage side to a conductive state while keeping the low-leg controllable switch of the phase of the alternating voltage side in a non-conductive state when the recognized direction of the current is outwards from the power electronic converter, and set the low-leg controllable switch of the phase of the alternating voltage side to the conductive state while keeping the high-leg controllable switch of the phase of the alternating voltage side in the non-conductive state when the recognized direction of the current is inwards to the power electronic converter.

In accordance with the invention, there is provided also a new computer program product. The computer program product comprises a non-volatile computer readable medium, e.g. a compact disc "CD", encoded with a computer program according to the invention.

Various exemplifying and non-limiting embodiments are described in accompanied dependent claims.

Exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments and their advantages are explained in greater detail below in the sense of examples and with reference to the accompanying drawings, in which.

DETAILED DESCRIPTION

The specific examples provided in the description given below should not be construed as limiting the scope and/or the applicability of the appended claims. Lists and groups of examples provided in the description given below are not exhaustive unless otherwise explicitly stated.

Figure 1:
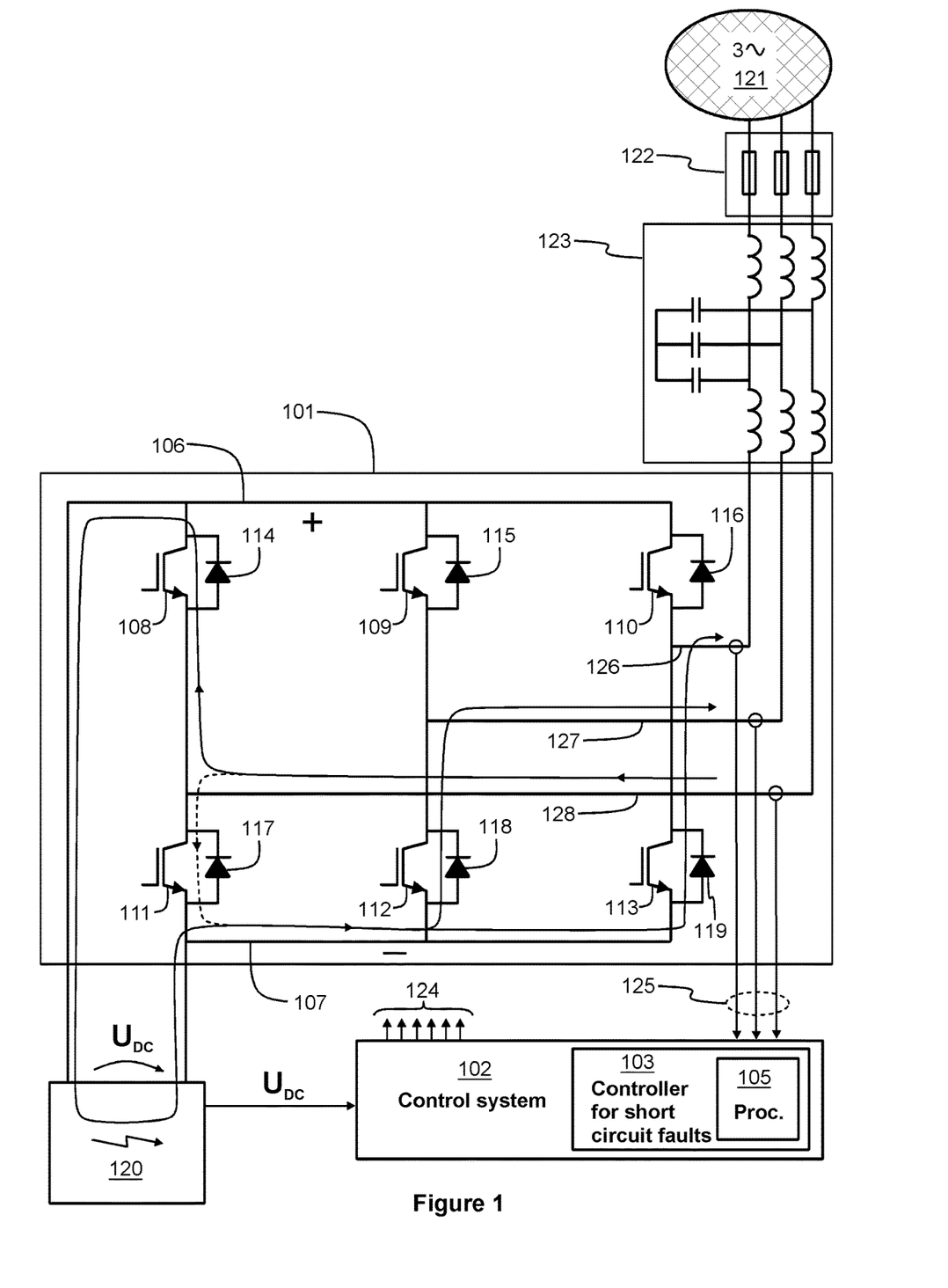
FIG. 1 illustrates a power electronic converter that comprises a controller according to an exemplifying and non-limiting embodiment.

FIG. 1 shows a schematic illustration of a power electronic converter according to an exemplifying and non-limiting embodiment. In the exemplifying situation shown in FIG. 1, an alternating voltage side of the power electronic converter is connected to a three-phase power grid 121 and a direct voltage side of the power electronic converter is connected to an electric system 120 that may comprise for example an intermediate circuit of a frequency converter or some other electric device or system having a direct voltage connection. The power electronic converter comprises a converter bridge 101 that comprises a positive direct voltage rail 106 and a negative direct voltage rail 107 connected to the direct voltage side of the power electronic converter. The converter bridge 101 comprises high-leg controllable switches 108, 109, and 110 connected to the positive direct voltage rail 106 and to the alternating voltage side of the power electronic converter, low-leg controllable switches 111, 112, and 113 connected to the negative direct voltage rail 107 and to the alternating voltage side, and freewheeling diodes 114, 115, 116, 117, 118, and 119 each being connected antiparallel with a respective one of the controllable switches. In the exemplifying case shown in FIG. 1, the controllable switches 108-113 are insulated gate bipolar transistors "IGBT". It is also possible that the controllable switches 108-113 are for example gate turn off thyristors "GTO", metal oxide semiconductor field effect transistors "MOSFETS", bipolar transistors, or some other suitable semiconductor switches. The power electronic converter comprises a control system 102 for controlling the controllable switches 108-113 during use of the power electronic converter. The control system 102 produces control signals 124 for controlling the controllable switches 108-113. The power electronic converter comprises input fuses 122 between the alternating voltage side of the power electronic converter and the three-phase power grid 121. Furthermore, the power electronic converter comprises a filter circuitry 123 between the converter bridge and the three-phase power grid 121. In the exemplifying case shown in FIG. 1, the filter circuitry 123 is an inductor-capacitor-inductor "LCL"-filter. The power electronic converter can be for example an active rectifier, a network inverter, or both.

The control system 102 of the power electronic converter comprises a controller 103 for controlling the controllable switches 108-113 after a short circuit has been detected in the direct voltage side of the power electronic converter. The controller 103 receives signals 125 which express at least directions of currents carried by phases 126, 127, and 128 of the alternating voltage side of the power electronic converter. In cases where there cannot be common mode current and information delivered to the controller 103 expresses also the magnitudes of the currents, it suffices that the information delivered to the controller 103 expresses the magnitudes and directions of currents of only two of the phases 126-128.

In the exemplifying situation shown in FIG. 1, it is assumed that there is a short circuit in the electric system 120 so that the direct voltage side of the power electronic converter is short circuited. Currents flowing via the freewheeling diodes at an exemplifying time instant are depicted with curved lines that are provided with arrow heads. As shown in FIG. 1, the currents flow via the freewheeling diodes 114, 118, and 119 at the above-mentioned exemplifying time instant. These freewheeling diodes 114, 118, and 119 would be heavily loaded by the currents needed to burn the input fuses 122 if the short circuit were reacted to with the traditional way. Especially, the freewheeling diode 114 would be very heavily loaded at the above-mentioned time instant since the sum of the currents of the freewheeling diodes 118 and 119 flows via the freewheeling diode 114. The controller 103 comprises a processing system 105 that is responsive to a fault signal that indicates whether there is a short circuit in the direct voltage side. The fault signal can be generated by the processing system 105 based on measured and/or estimated data, or there can be other means for detecting the short circuit and for generating the fault signal.

In a controller according to an exemplifying and non-limiting embodiment, the processing system 105 is configured to compare the level of direct voltage $U_{DC}$ of the direct voltage side to a predetermined limit. The processing system 105 sets the above-mentioned fault signal to indicate that there is a short circuit in the direct voltage side if the level of the direct voltage $U_{DC}$ is below the predetermined limit. In a controller according to another exemplifying and non-limiting embodiment, the processing system 105 is configured to compare the level of direct voltage $U_{DC}$ of the direct voltage side to a first predetermined limit and compare the magnitude of the current of each of the phases 126-128 to a second predetermined limit. The processing system 105 sets the fault signal to indicate that there is a short circuit in the direct voltage side if the level of the direct voltage $U_{DC}$ is below the first predetermined limit and the magnitude of the current in at least one of the phases 126-128 exceeds the second predetermined limit.

Without limiting the generality, the phase 128 of the alternating voltage side is considered in the following. The processing system 105 of the controller 103 is configured to recognize the direction of the current of the phase 128 in response to a situation in which the above-mentioned fault signal indicates that there is a short circuit in the direct voltage side. Depending on the recognized direction of the current of the phase 128, the processing system 105 sets either the high-leg controllable switch 108 or the low-leg controllable switch 111 to a conductive state while keeping the other one of the controllable switches 108 and 111 in a non-conductive state. In the exemplifying situation depicted in FIG. 1, the direction of the current of the phase 128 is inwards to the power electronic converter and thus the low-leg controllable switch 111 is set to the conductive state whereas the high-leg controllable switch 108 is kept in the non-conductive state. If the direction of the current of the phase 128 were opposite i.e. outwards from the power electronic converter, the high-leg controllable switch 108 would be set to the conductive state and the low-leg controllable switch 111 would be kept in the non-conductive state.

As the direct voltage $U_{DC}$ is substantially zero, the low-leg controllable switch 111 and the freewheeling diode 114 are parallel connected. A case where there is a non-zero residual voltage in the direct voltage side of the power electronic converter is discussed later in this document. In FIG. 1, current of the low-leg controllable switch 111 is depicted with a curved dashed line provided with an arrow head. As the current of the phase 128 is divided into two different paths, the time integrals of squared currents, i.e. $I^2t$ values, decrease. If the current of the phase 128 is distributed evenly between the freewheeling diode 114 and the controllable switch 111, the $I^2t$ value of each of these electronic components is only ¼ of the $I^2t$ value that would be related to the freewheeling diode 114 in a case where all the controllable switches 108-113 are kept non-conductive after the short circuit. The electrical properties of diodes and IGBTs are typically such that the current distribution between them is quite equal up to a current value where an IGBT desaturates.

The above-described exemplifying controller 103 is configured to control the high-leg and low-leg controllable switches of a phase that, at each time, carries the largest current. In the exemplifying momentary situation shown in FIG. 1, the phase that carries the largest current is the phase 128.

Figure 2A:
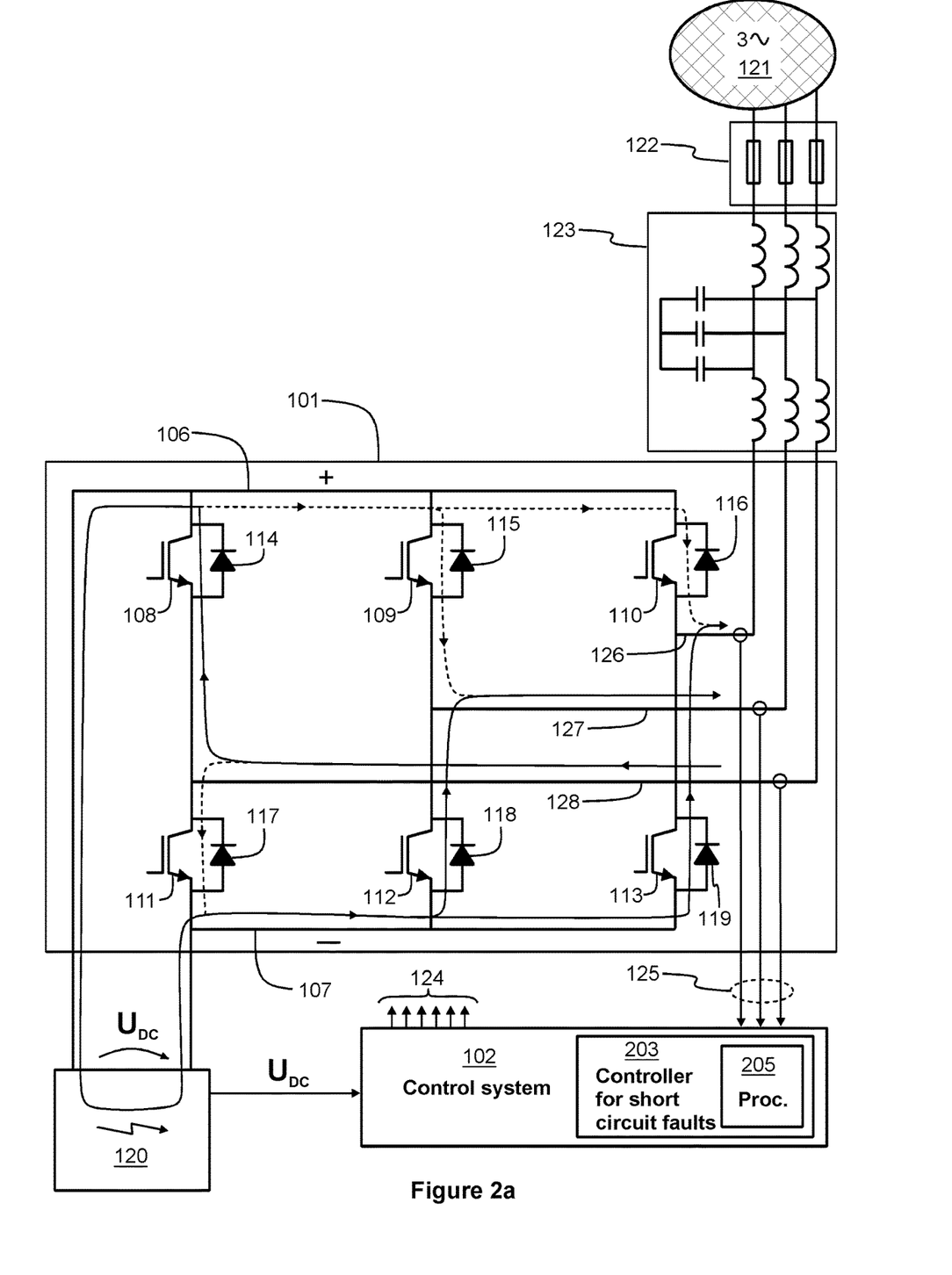
FIGS. 2a and 2b illustrate a power electronic converter that comprises a controller according to an exemplifying and non-limiting embodiment.
Figure 2B:
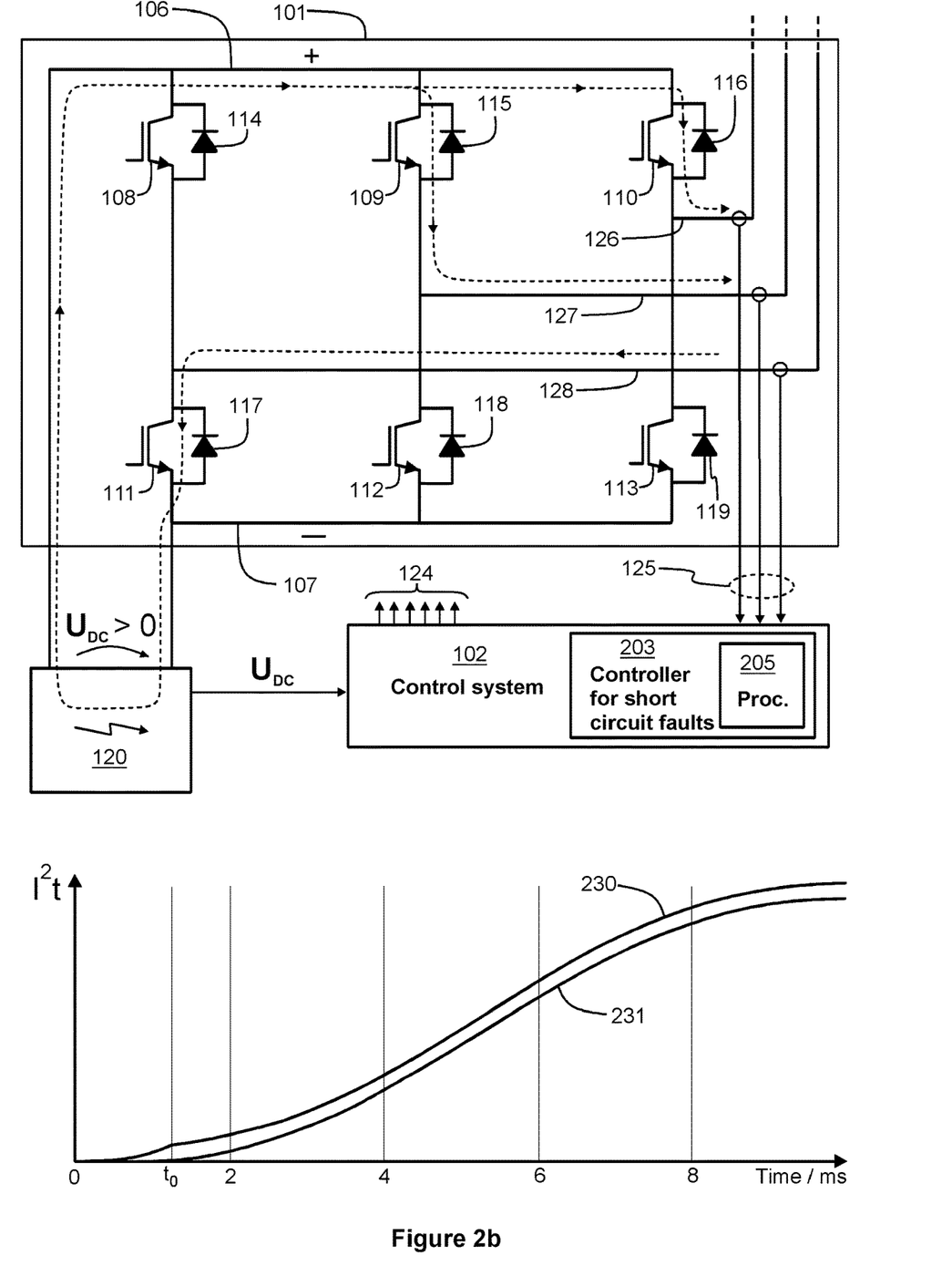

FIGS. 2a and 2b illustrate a power electronic converter that comprises a controller 203 according to an exemplifying and non-limiting embodiment. The controller 203 comprises a processing system 205 that sets, in response to a short circuit in the direct voltage side, the high-leg controllable switch of each of the phases 126-128 to the conductive state while keeping the low-leg controllable switch of the phase under consideration in the non-conductive state when the recognized direction of the current of the phase under consideration is outwards from the power electronic converter. Correspondingly, the processing system 205 sets the low-leg controllable switch of each of the phases 126-128 to the conductive state while keeping the high-leg controllable switch of the phase under consideration in the non-conductive state when the recognized direction of the current of the phase under consideration is inwards to the power electronic converter. FIG. 2a shows an exemplifying situation where the currents of the phases 126 and 127 are directed outwards from the power electronic converter and the current of the phase 128 is directed inwards to the power electronic converter. Therefore, the high-leg controllable switches 109 and 110 and the low-leg controllable switch 111 are set to the conductive state, whereas the low-leg controllable switches 112 and 113 and the high-leg controllable 108 switch are kept in the non-conductive state. In FIG. 2a, currents of the freewheeling diodes are depicted with curved lines provided with arrow heads and currents of the controllable switches are depicted with curved dashed lines provided with arrow heads.

Below-presented Table 1 shows a switching-scheme used by a controller according to an exemplifying and non-limiting embodiment. Each 3-phase grid period has six sub-periods 1-6 which are shown in Table 1. The length of each sub-period is 60 electrical degrees.

TABLE 1

| | Directions currents of the phases | | | | | |
|---|---|---|---|---|---|---|
| Sub-period | 1 | 2 | 3 | 4 | 5 | 6 |
| Phase 126 | inwards | inwards | inwards | outwards | outwards | outwards |
| Phase 127 | outwards | outwards | inwards | inwards | inwards | outwards |
| Phase 128 | inwards | outwards | outwards | outwards | inwards | inwards |
| | Switching sequence during one grid period | | | | | |
| Phase 126 | L | L | L | H | H | H |
| Phase 127 | H | H | L | L | L | H |
| Phase 128 | L | H | H | H | L | L |

H = a high-leg controllable switch is conductive, L = a low-leg controllable switch is conductive.

Simulated results for a power electronic converter of the kind illustrated in FIG. 2a are presented in Table 2 on the next page of this document. In the first simulation, all controllable switches were kept in the non-conductive state during a short circuit in the direct voltage side of the power electronic converter. In the second simulation, the switching-scheme according to Table 1 was used. The saturation of inductors in the LCL-filter 123 was not modelled, and the desaturation of the IGBT controllable switches was not modelled. The simulation period covers the first 10 milliseconds after the short circuit. The 10 milliseconds simulation period contains a commutation in the phase 126.

The simulated results presented in Table 2 show that the control of the IGBT controllable switches decreases the $I^2t$ values of the freewheeling diodes down to about 25% of the values corresponding to the case where all the IGBT controllable switches are kept in the non-conductive state during the short circuit. Furthermore, the control of the IGBT controllable switches increases the phase-specific $I^2t$ values in the input fuses by about 5%.

TABLE 2

| | $I^2t$ [$A^2s$] All IGBTs non-conductive (1$^{st}$ simulation) | $I^2t$ Switching scheme of Table 1 (2$^{nd}$ simulation) | $I^2t$ ratio for a diode for the 1$^{st}$ and 2$^{nd}$ simulations | $I^2t$/phase All IGBTs non-conductive (1$^{st}$ simulation) | $I^2t$/phase Switching scheme of Table 1 (2$^{nd}$ simulation) |
|---|---|---|---|---|---|
| Diode 114 | 1967920 | 513272 | 3.83 | 1967041 | 2057761 |
| IGBT 111 | 0 | 516070 | — | | |
| IGBT 109 | 0 | 256884 | — | 970127 | 1022251 |
| Diode 118 | 968913 | 254754 | 3.8 | | |
| IGBT 110 | 0 | 107940 | — | | |
| Diode 116 | 26837 | 6763 | 3.96 | 451173 | 456885 |
| Diode 119 | 424892 | 107031 | 3.96 | | |
| IGBT 113 | 0 | 7004 | — | | |

In a controller according to an exemplifying and non-limiting embodiment, the processing system 205 switches the high-leg controllable switch of each of the phases 126-128 repeatedly between the conductive and non-conductive states while keeping the low-leg controllable switch of the phase under consideration in the non-conductive state when the recognized direction of the current of the phase under consideration is outwards from the power electronic converter.

Correspondingly, the processing system 205 switches the low-leg controllable switch of each of the phases 126-128 repeatedly between the conductive and non-conductive states while keeping the high-leg controllable switch of the phase under consideration in the non-conductive state when the recognized direction of the current of the phase under consideration is inwards to the power electronic converter.

A switching frequency with which a controllable switch is switched between the conductive and non-conductive states is advantageously high enough so that local peaks in the waveform of the current of the controllable switch can be kept small enough. The peaks are advantageously as small as possible to avoid desaturation of the IGBT controllable switches. The switching frequency can be for example at least 1 kHz, or at least 2.5 kHz. An advantageous value for the switching frequency can be found with e.g. measurements and/or simulations.

In addition to the switching frequency, a duty-cycle of the controllable switches can be adjusted for finding out an advantageous operation. The duty-cycle is defined as a ratio between the temporal length of a part of a switching cycle when a controllable switch is conductive and the temporal length of the whole switching cycle, where the switching cycle can be defined as a time interval between successive transitions from the non-conductive state to the conductive state and the switching cycle comprises one transition from the conductive state to the non-conductive state. The duty-cycle can be for example between 30% and 100%. It is to be noted that there are many possible ways of switching during the fault. There can be a constant duty cycle and a constant switching frequency, but one or both can also vary in accordance with e.g. phase current. There may also be some benefits to have a phase-shift between switching in different phases, like interleaved modulation.

Simulated results for the maximum of $I^2t$ values of the freewheeling diodes 114-116, for the maximum of $I^2t$ values of the IGBT controllable switches 114-116, and for the maximum of $I^2t$ values of the phases 126-128 i.e. the maximum of $I^2t$ values of the input fuses 122 are shown in Tables 3a and 3b for different switching frequencies and duty-cycles of the IGBT controllable switches. The duty-cycle 100% corresponds to the switching-scheme presented in Table 1. The simulation period covers the first 20 milliseconds after the fault.

In the exemplifying case related to Table 3a, the fault resistance $R_{fault}$ is 100 mΩ and the fault inductance $L_{fault}$ is 200 nH in form of series resistance and inductance, and the short-circuit ratio Rsce of the supply grid, i.e. the ratio of the short-circuit power of the supply grid to the nominal apparent power of the power electronic converter, is 100.

In the exemplifying case related to Table 3b, the fault resistance $R_{fault}$ is 1 mΩ and the fault inductance $L_{fault}$ is 50 nH in form of series resistance and inductance, and the short-circuit ratio Rsce of the supply grid is 100.

TABLE 3a $R_{fault}$ = 100 mΩ, $L_{fault}$ = 200 nH, Rsce = 100.

| Switching freq./kHz | Duty cycle/ % | Max I²t of diodes [A²s] | Max I²t of IGBTs [A²s] | Max I²t of phases [A²s] | Max I²t of fault [A²s] |
|---|---|---|---|---|---|
| 1 | 0 | 290000 | — | 490000 | 740000 |
| 1 | 10 | 360000 | 40000 | 670000 | 760000 |
| 1 | 20 | 430000 | 80000 | 880000 | 740000 |
| 1 | 30 | 520000 | 210000 | 1060000 | 630000 |
| 1 | 40 | 670000 | 410000 | 1270000 | 390000 |
| 1 | 50 | 860000 | 580000 | 1860000 | 210000 |
| 1 | 60 | 790000 | 610000 | 1890000 | 110000 |
| 1 | 70 | 730000 | 650000 | 1880000 | 110000 |
| 1 | 80 | 650000 | 650000 | 1980000 | 0 |
| 1 | 90 | 560000 | 560000 | 1990000 | 0 |
| 1 | 100 | 650000 | 810000 | 1970000 | 0 |
| 10 | 0 | 290000 | — | 490000 | 740000 |
| 10 | 10 | 340000 | 20000 | 630000 | 740000 |
| 10 | 20 | 390000 | 60000 | 810000 | 710000 |
| 10 | 30 | 590000 | 220000 | 1090000 | 610000 |
| 10 | 40 | 740000 | 440000 | 1470000 | 370000 |
| 10 | 50 | 910000 | 880000 | 1880000 | 100000 |
| 10 | 60 | 830000 | 800000 | 1920000 | 70000 |
| 10 | 70 | 740000 | 720000 | 1950000 | 50000 |
| 10 | 80 | 660000 | 640000 | 1950000 | 50000 |
| 10 | 90 | 570000 | 560000 | 1980000 | 30000 |
| 10 | 100 | 640000 | 810000 | 1970000 | 0 |

Table 3b is shown on the next page.

TABLE 3b $R_{fault}$ = 1 mΩ, $L_{fault}$ = 50 nH, Rsce = 100.

| Switching freq./kHz | Duty cycle/ % | Max I²t of diodes [A²s] | Max I²t of IGBTs [A²s] | Max I²t of phases [A²s] | Max I²t of fault [A²s] |
|---|---|---|---|---|---|
| 1 | 0 | 1750000 | — | 1890000 | 2670000 |
| 1 | 10 | 1630000 | 60000 | 1900000 | 2200000 |
| 1 | 20 | 1490000 | 120000 | 1920000 | 1680000 |
| 1 | 30 | 1360000 | 190000 | 1930000 | 1260000 |
| 1 | 40 | 1230000 | 250000 | 1950000 | 970000 |
| 1 | 50 | 1090000 | 300000 | 1960000 | 640000 |
| 1 | 60 | 960000 | 350000 | 1970000 | 470000 |
| 1 | 70 | 840000 | 390000 | 1980000 | 310000 |
| 1 | 80 | 720000 | 430000 | 1990000 | 150000 |
| 1 | 90 | 600000 | 450000 | 2000000 | 70000 |
| 1 | 100 | 650000 | 540000 | 1990000 | 80000 |
| 10 | 0 | 1750000 | — | 1890000 | 2670000 |
| 10 | 10 | 1680000 | 10000 | 1890000 | 2430000 |
| 10 | 20 | 1570000 | 50000 | 1910000 | 1990000 |
| 10 | 30 | 1440000 | 110000 | 1920000 | 1520000 |
| 10 | 40 | 1300000 | 180000 | 1940000 | 1070000 |
| 10 | 50 | 1070000 | 330000 | 1960000 | 570000 |
| 10 | 60 | 960000 | 390000 | 1970000 | 330000 |
| 10 | 70 | 840000 | 430000 | 1980000 | 240000 |
| 10 | 80 | 730000 | 460000 | 1990000 | 150000 |
| 10 | 90 | 620000 | 480000 | 2000000 | 50000 |
| 10 | 100 | 650000 | 540000 | 1990000 | 80000 |

FIG. 2b shows an exemplifying situation where the direct voltage side of the power electronic converter has a positive residual voltage after a short circuit that has occurred in the electric system 120. The initial fault currents were directed outwards in the phase 126 and inwards in the phases 127 and 128. Therefore, the high-leg controllable switches 109 and 110 and the low-leg controllable switch 111 were set to the conductive state, whereas the low-leg controllable switches 112 and 113 and the high-leg controllable switch 108 are kept in the non-conductive state. As there is the positive residual voltage in the direct voltage side, the freewheeling diodes 114, 118, and 119 are reverse biased and thus non-conductive. In FIG. 2b, the currents of the controllable switches are depicted with curved dashed lines provided with arrow heads.

Furthermore, FIG. 2b illustrates the temporal trends of the I²t values of the controllable switch 109 and the freewheeling diode 118. A curve 230 depicts the temporal trend of the I²t value of the controllable switch 109, and a curve 231 depicts the temporal trend of the I²t value of the freewheeling diode 118. The time instant time=0 corresponds to the beginning of the short circuit. The controllable switches 109-111 are set to the conductive state soon after the beginning of the short circuit. During a time-period from 0 to $t_0$, the electric system 120 is discharged by the current that flows through the controllable switches 109-111 so that the residual voltage gets zero at the time instant $t_0$. Thus, the control of the controllable switches causes that the residual voltage is discharged towards the three-phase power grid. This means that less energy is supplied to the actual fault place mitigating a risk of explosion in the fault place.

As long as there is the positive residual voltage, the freewheeling diodes 114, 118, and 119 are reverse biased. Thus, the I²t values of the freewheeling diodes stay zero during the time-period from 0 to $t_0$. After the time instant $t_0$, the freewheeling diodes 114, 118, and 119 are no more reverse biased and the I²t values of the freewheeling diodes grow. After the time instant $t_0$, the situation is such as illustrated in FIG. 2a. The curve 231 shows that the I²t value of the freewheeling diode 118 grows after $t_0$, and the curve 230 shows that the growth-rate of the I²t value of the controllable switch 109 decreases at the time instant $t_0$. The decrease in the growth-rate of the I²t value of the controllable switch 109 results in current sharing between the controllable switch 109 and the freewheeling diode 118 after the time instant $t_0$.

The controller 103 shown in FIG. 1 as well as the controller 203 shown in FIGS. 2a and 2b can be implemented with one or more processor circuits each of which can be a programmable processor circuit provided with appropriate software, a dedicated hardware processor such as for example an application specific integrated circuit "ASIC", or a configurable hardware processor such as for example a field programmable gate array "FPGA". Furthermore, the controller may comprise one or more memory circuits each of which can be for example a random-access memory "RAM".

The above-described controllers 103 and 203 are examples of a device for controlling a power electronic converter that comprises high-leg controllable switches connected to a positive direct voltage rail of the power electronic converter and to an alternating voltage side of the power electronic converter and low-leg controllable switches connected to a negative direct voltage rail of the power electronic converter and to the alternating voltage side, wherein the device comprises:
  means for recognizing a direction of current carried by a phase of the alternating voltage side in response to a fault signal indicative of a short circuit in a direct voltage side of the power electronic converter,
  means for setting the high-leg controllable switch of the phase of the alternating voltage side to a conductive state while keeping the low-leg controllable switch of the phase of the alternating voltage side in a non-conductive state when the recognized direction of the current is outwards from the power electronic converter, and means for setting the low-leg controllable switch of the phase of the alternating voltage side to the conductive state while keeping the high-leg controllable switch of the phase of the alternating voltage side in the non-conductive state when the recognized direction of the current is inwards to the power electronic converter.

Figure 3:
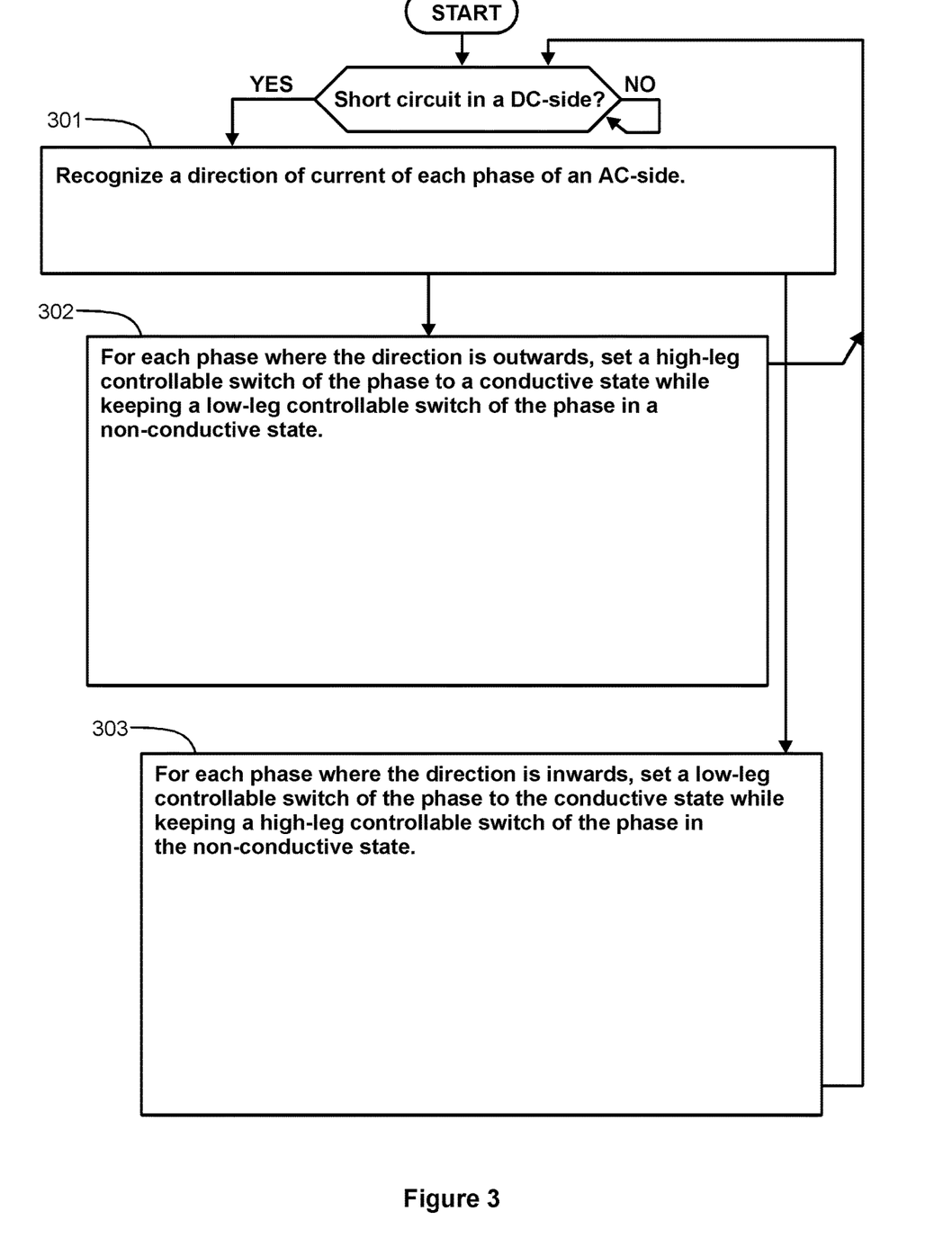
FIG. 3 shows a flowchart of a method according to an exemplifying and non-limiting embodiment for controlling a power electronic converter.

FIG. 3 shows a flowchart of a method according to an exemplifying and non-limiting embodiment for controlling a power electronic converter of the kind described above. The method comprises the following control actions during a short circuit occurring in the direct voltage side of the power electronic converter:

action 301: recognizing a direction of current carried by each phase of the alternating voltage side of the power electronic converter, action 302: setting the high-leg controllable switch of the phase under consideration to a conductive state while keeping the low-leg controllable switch of the phase under consideration in a non-conductive state when the recognized direction of the current of the phase under consideration is outwards from the power electronic converter, and action 303: setting the low-leg controllable switch of the phase under consideration to the conductive state while keeping the high-leg controllable switch of the phase under consideration in the non-conductive state when the recognized direction of the current of the phase under consideration is inwards to the power electronic converter.

A method according to an exemplifying and non-limiting embodiment comprises:

switching the high-leg controllable switch of each phase of the alternating voltage side repeatedly between the conductive and non-conductive states while keeping the low-leg controllable switch of the phase under consideration in the non-conductive state when the recognized direction of the current of the phase under consideration is outwards from the power electronic converter, and switching the low-leg controllable switch of each phase of the alternating voltage side repeatedly between the conductive and non-conductive states while keeping the high-leg controllable switch of the phase under consideration in the non-conductive state when the recognized direction of the current of the phase under consideration is inwards to the power electronic converter.

In a method according to an exemplifying and non-limiting embodiment, the above-mentioned high-leg controllable switches and the low-leg controllable switches are switched between the conductive and non-conductive states so that a switching frequency of each controllable switch being switched is at least 1 kHz. In a method according to an exemplifying and non-limiting embodiment, the switching frequency is at least 2.5 kHz.

In a method according to an exemplifying and non-limiting embodiment, the above-mentioned high-leg controllable switches and the low-leg controllable switches are switched between the conductive and non-conductive states so that a duty-cycle of each controllable switch being switched is between 30% and 100%.

A method according to an exemplifying and non-limiting embodiment comprises:

comparing the level of direct voltage of the direct voltage side of the power electronic converter to a predetermined limit, and starting the control actions 301-303 related to the short circuit when the level of the direct voltage is below the predetermined limit.

A method according to an exemplifying and non-limiting embodiment comprises:

comparing the level of the direct voltage of the direct voltage side of the power electronic converter to a first predetermined limit, comparing a magnitude of the current of each phase of the alternating voltage side of the power electronic converter to a second predetermined limit, and starting the control actions 301-303 related to the short circuit when the level of the direct voltage is below the first predetermined limit and the magnitude of the current of at least one phase of the alternating voltage side exceeds the second predetermined limit.

A computer program according to an exemplifying and non-limiting embodiment comprises computer executable instructions for controlling a programmable processor to carry out actions related to a method according to any of the above-described exemplifying and non-limiting embodiments.

A computer program according to an exemplifying and non-limiting embodiment comprises software modules for controlling a power electronic converter of the kind described above. The software modules comprise computer executable instructions for controlling a programmable processor to:

recognize the direction of current carried by a phase of the alternating voltage side of the power electronic converter in response to a fault signal indicative of a short circuit in the direct voltage side of the power electronic converter, set the high-leg controllable switch of the phase of the alternating voltage side to a conductive state while keeping the low-leg controllable switch of the phase of the alternating voltage side in a non-conductive state when the recognized direction of the current is outwards from the power electronic converter, and set the low-leg controllable switch of the phase of the alternating voltage side to the conductive state while keeping the high-leg controllable switch of the phase of the alternating voltage side in the non-conductive state when the recognized direction of the current is inwards to the power electronic converter.

The above-mentioned software modules can be e.g. subroutines and/or functions implemented with a programming language suitable for the programmable processor under consideration.

A computer program product according to an exemplifying and non-limiting embodiment comprises a computer readable medium, e.g. a compact disc "CD", encoded with a computer program according to an exemplifying embodiment.

A signal according to an exemplifying and non-limiting embodiment is encoded to carry information that defines a computer program according to an exemplifying embodiment.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A controller for controlling a power electronic converter that comprises high-leg controllable switches connected to a positive direct voltage rail of the power electronic converter and to an alternating voltage side of the power electronic converter and low-leg controllable switches connected to a negative direct voltage rail of the power electronic converter and to the alternating voltage side, wherein the controller comprises a processing system configured to:
  recognize a direction of a current of a phase of the alternating voltage side in response to a fault signal indicative of a short circuit in a direct voltage side of the power electronic converter, thereby making the phase a phase under consideration,
  set the high-leg controllable switch of the phase of the alternating voltage side to a conductive state while keeping the low-leg controllable switch of the phase of the alternating voltage side in a non-conductive state when the recognized direction of the current is outwards from the power electronic converter, and
  set the low-leg controllable switch of the phase of the alternating voltage side to the conductive state while keeping the high-leg controllable switch of the phase of the alternating voltage side in the non-conductive state when the recognized direction of the current is inwards to the power electronic converter.

2. The controller according to claim 1, wherein the processing system is configured to set, in response to the short circuit, the high-leg controllable switch of each phase of the alternating voltage side to the conductive state while keeping the low-leg controllable switch of the phase under consideration in the non-conductive state when a recognized direction of the current of the phase under consideration is outwards from the power electronic converter, and to set the low-leg controllable switch of each phase of the alternating voltage side to the conductive state while keeping the high-leg controllable switch of the phase under consideration in the non-conductive state when the recognized direction of the current of the phase under consideration is inwards to the power electronic converter.

3. The controller according to claim 1, wherein the processing system is configured to compare a level of a direct voltage of the direct voltage side of the power electronic converter to a predetermined limit and set the fault signal to indicate the short circuit when the level of the direct voltage is below the predetermined limit.

4. The controller according to claim 1, wherein the processing system is configured to compare a level of a direct voltage of the direct voltage side of the power electronic converter to a first predetermined limit, compare a magnitude of a current of each phase of the alternating voltage side of the power electronic converter to a second predetermined limit, and set the fault signal to indicate the short circuit when the level of the direct voltage is below the first predetermined limit and the magnitude of the current of at least one phase of the alternating voltage side exceeds the second predetermined limit.

5. The controller according to claim 1, wherein the processing system is configured to, prior to the processing system recognizing the direction of the current of the phase of the alternating voltage side, set the high-leg controllable switches and the low-leg controllable switches to the non-conductive state in response to the fault signal indicative of the short circuit in the direct voltage side of the power electronic converter.

6. A power electronic converter comprising:
  a converter bridge comprising positive and negative direct voltage rails connected to a direct voltage side of the power electronic converter, high-leg controllable switches connected to the positive direct voltage rail and to an alternating voltage side of the power electronic converter, low-leg controllable switches connected to the negative direct voltage rail and to the alternating voltage side, and freewheeling diodes each being connected antiparallel with one of the high-leg controllable switches and the low-leg controllable switches, and
  a control system for controlling the high-leg controllable switches and the low-leg controllable switches during use of the power electronic converter,
wherein the control system comprises the controller according to claim 1 for controlling the high-leg controllable switches and the low-leg controllable switches during a short circuit in the direct voltage side.

7. The power electronic converter according to claim 6, wherein the power electronic converter is an active rectifier for transferring electric energy from the alternating voltage side to the direct voltage side.

8. The controller according to claim 1, wherein the processing system is configured to switch the high-leg controllable switch of the phase of the alternating voltage side repeatedly between the conductive and non-conductive states while keeping the low-leg controllable switch of the phase under consideration in the non-conductive state when the recognized direction of the current of the phase under consideration is outwards from the power electronic converter, and to switch the low-leg controllable switch of the phase under consideration repeatedly between the conductive and non-conductive states while keeping the high-leg controllable switch of the phase under consideration in the non-conductive state when the recognized direction of the current of the phase under consideration is inwards to the power electronic converter.

9. The controller according to claim 3, wherein the processing system is configured to switch each high-leg controllable switch and each low-leg controllable switch between the conductive and non-conductive states so that a duty-cycle is between 30% and 100%.

10. The controller according to claim 3, wherein the processing system is configured to switch each high-leg controllable switch and each low-leg controllable switch between the conductive and non-conductive states so that a switching frequency is at least 1 kHz.

11. The controller according to claim 4, wherein the switching frequency is at least 2.5 kHz.

12. A method for controlling a power electronic converter that comprises high-leg controllable switches connected to a positive direct voltage rail of the power electronic converter and to an alternating voltage side of the power electronic converter and low-leg controllable switches connected to a negative direct voltage rail of the power electronic converter and to the alternating voltage side wherein the method comprises control actions during a short circuit occurring in a direct voltage side of the power electronic converter as follows:
  recognizing a direction of a current of a phase of the alternating voltage side, thereby making the phase a phase under consideration, setting the high-leg controllable switch of the phase of the alternating voltage side to a conductive state while keeping the low-leg controllable switch of the phase of the alternating voltage side in a non-conductive state when the recognized direction of the current is outwards from the power electronic converter, and setting the low-leg controllable switch of the phase of the alternating voltage side to the conductive state while keeping the high-leg controllable switch of the phase of the alternating voltage side in the non-conductive state when the recognized direction of the current is inwards to the power electronic converter.

13. The method according to claim 12, wherein the method comprises setting the high-leg controllable switch of each phase of the alternating voltage side to the conductive state while keeping the low-leg controllable switch of the phase under consideration in the non-conductive state when a recognized direction of the current of the phase under consideration is outwards from the power electronic converter and setting the low-leg controllable switch of each phase of the alternating voltage side to the conductive state while keeping the high-leg controllable switch of the phase under consideration in the non-conductive state when the recognized direction of the current of the phase under consideration is inwards to the power electronic converter.

14. The method according to claim 12, wherein the method comprises switching the high-leg controllable switch of the phase of the alternating voltage side repeatedly between the conductive and non-conductive states while keeping the low-leg controllable switch of the phase under consideration in the non-conductive state when the recognized direction of the current of the phase under consideration is outwards from the power electronic converter, and switching the low-leg controllable switch of the phase under consideration repeatedly between the conductive and non-conductive states while keeping the high-leg controllable switch of the phase under consideration in the non-conductive state when the recognized direction of the current of the phase under consideration is inwards to the power electronic converter.

15. The method according to claim 12, wherein the method comprises comparing a level of a direct voltage of the direct voltage side of the power electronic converter to a predetermined limit and starting the control actions related to the short circuit when the level of the direct voltage is below the predetermined limit.

16. The method according to claim 12, wherein the method comprises comparing a level of a direct voltage of the direct voltage side of the power electronic converter to a first predetermined limit, comparing a magnitude of a current of each phase of the alternating voltage side of the power electronic converter to a second predetermined limit, and starting the control actions related to the short circuit when the level of the direct voltage is below the first predetermined limit and the magnitude of the current of at least one phase of the alternating voltage side exceeds the second predetermined limit.

17. The method according to claim 14, wherein each high-leg controllable switch and each low-leg controllable switch is switched between the conductive and non-conductive states so that a duty-cycle is between 30% and 100%.

18. The method according to claim 14, wherein each high-leg controllable switch and each low-leg controllable switch is switched between the conductive and non-conductive states so that a switching frequency is at least 1 kHz.

19. The method according to claim 18, wherein the switching frequency is at least 2.5 kHz.

20. A non-transitory computer readable medium comprising a computer program having computer executable instructions for controlling a programmable processor to:

control a power electronic converter that comprises high-leg controllable switches connected to a positive direct voltage rail of the power electronic converter and to an alternating voltage side of the power electronic converter and low-leg controllable switches connected to a negative direct voltage rail of the power electronic converter and to the alternating voltage side, recognize a direction of a current of a phase of the alternating voltage side in response to a fault signal indicative of a short circuit in a direct voltage side of the power electronic converter, set the high-leg controllable switch of the phase of the alternating voltage side to a conductive state while keeping the low-leg controllable switch of the phase of the alternating voltage side in a non-conductive state when the recognized direction of the current is outwards from the power electronic converter, and set the low-leg controllable switch of the phase of the alternating voltage side to the conductive state while keeping the high-leg controllable switch of the phase of the alternating voltage side in the non-conductive state when the recognized direction of the current is inwards to the power electronic converter.

* * * * *

UNITED STATES PATENT AND TRADEMARK OFFICE
CERTIFICATE OF CORRECTION

PATENT NO. : 11,381,158 B2
APPLICATION NO. : 16/595851
DATED : July 5, 2022
INVENTOR(S) : Jani Matti Perkiö, Juha Norrena and Nicklas Jan Anders Södö

It is certified that error appears in the above-identified patent and that said Letters Patent is hereby corrected as shown below:

In the Claims

Column 14, Line 43, Claim 9, "claim 3" should read as --claim 8--.

Column 14, Line 48, Claim 10, "claim 3" should read as --claim 8--.

Column 14, Line 53, Claim 11, "claim 4" should read as --claim 10--.

Signed and Sealed this
Eleventh Day of October, 2022

Katherine Kelly Vidal
*Director of the United States Patent and Trademark Office*